June 21, 1927.
S. ZGLICZYNSKI
1,633,428
AUTOMATIC WIND MOTOR
Filed Nov. 28, 1925
2 Sheets-Sheet 1
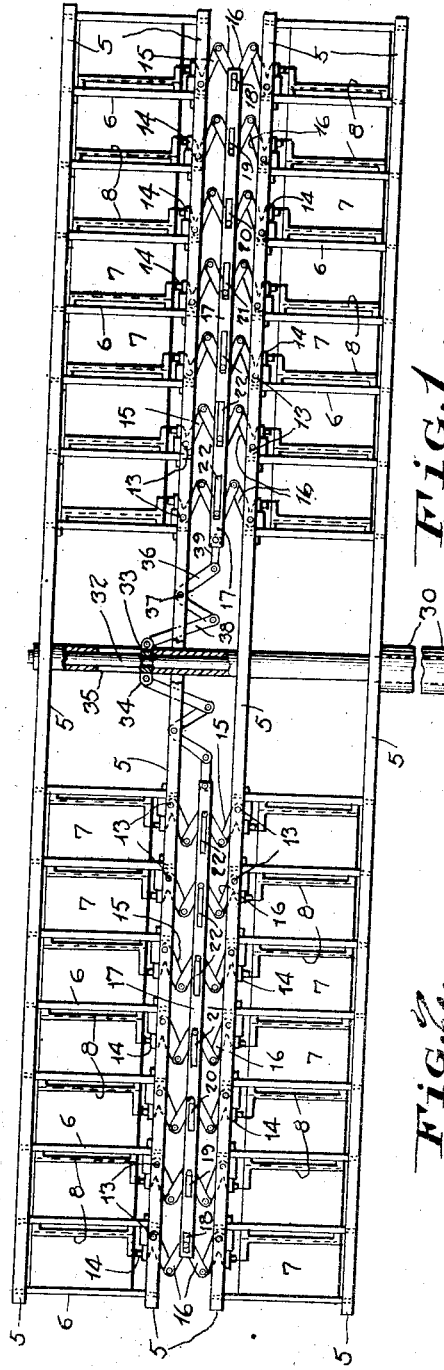
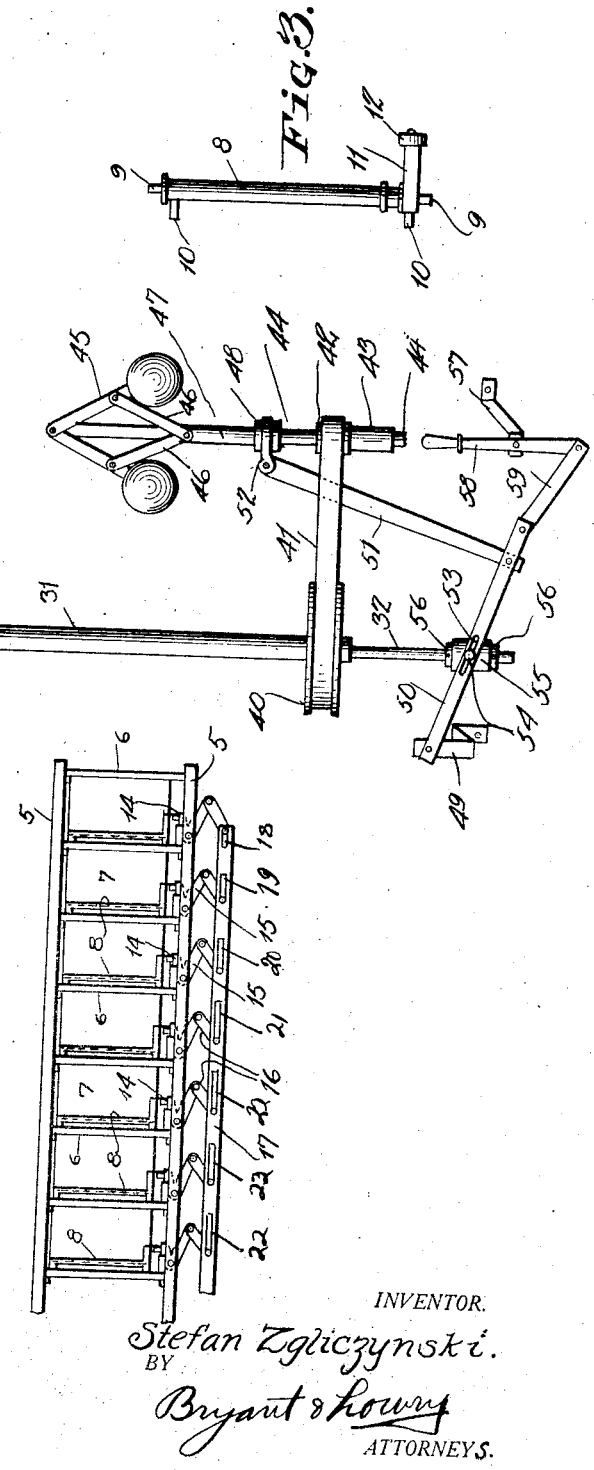
INVENTOR.
Stefan Zgliczynski.
BY
Bryant & Lowry
ATTORNEYS.

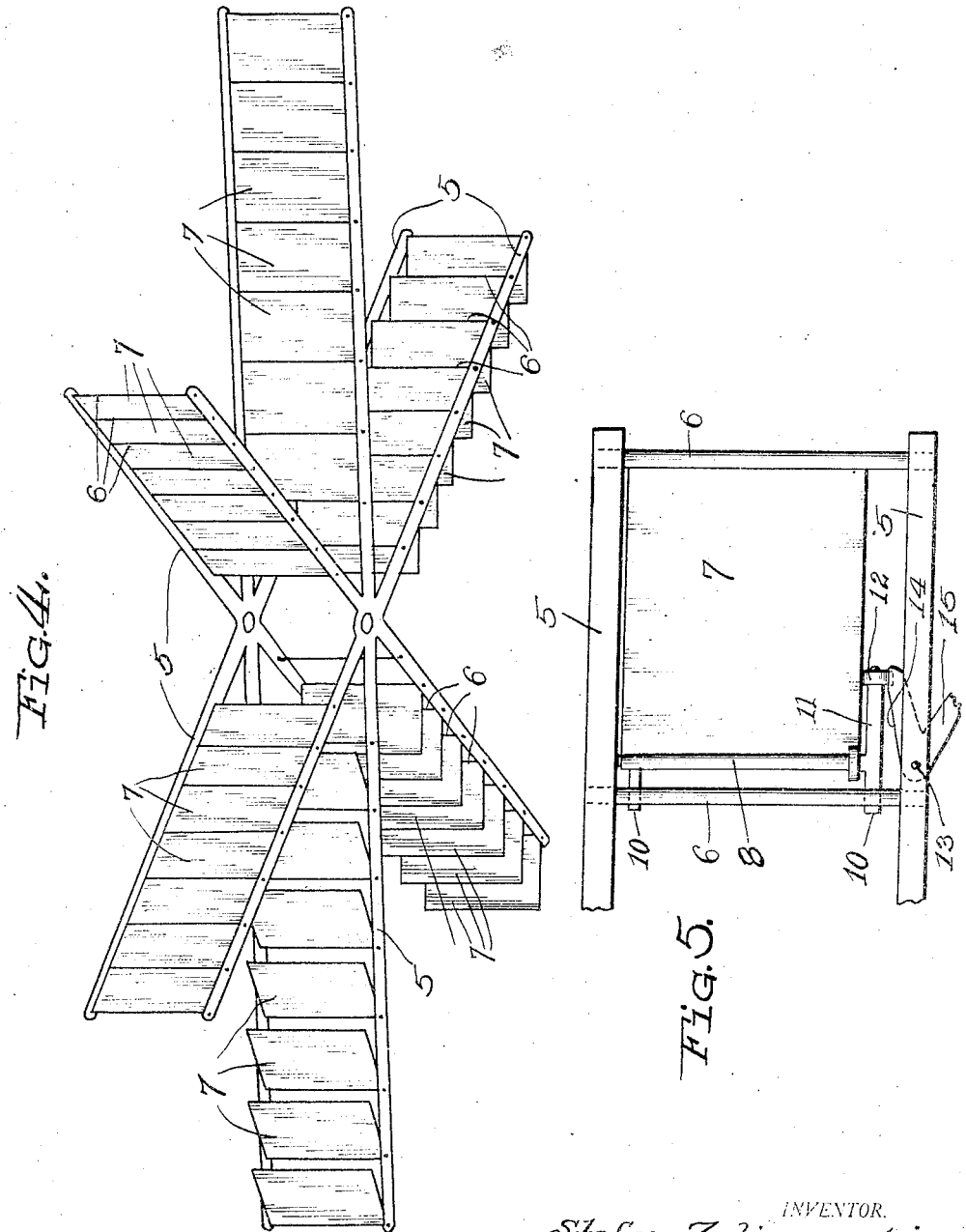

Patented June 21, 1927.

1,633,428

UNITED STATES PATENT OFFICE.

STEFAN ZGLICZYNSKI, OF BALTIMORE, MARYLAND.

AUTOMATIC WIND MOTOR.

Application filed November 28, 1925. Serial No. 71,991.

This invention relates to certain new and useful improvements in automatic wind motors.

The primary object of the invention is to provide a wind motor of the feathering blade type with automatically operating devices associated with the blades of the motor and under control of a speed governor to effect feathering movements of the blades for lessening or retarding the speed of rotation of a shaft with which the motor is associated.

An important object of the invention is to provide an automatic wind motor embodying a plurality of feathering blades with automatically operating devices associated with the blades for normally holding the same in their closed operative positions with said devices being constructed to cause successive feathering movements of the blades at the outer ends of the supporting arms therefor beginning with the outermost blade and further constructed to cause simultaneous feathering movements of a set of blades substantially midway and adjacent the inner ends of the supporting arms to render the motor inoperative when an excessive speed of rotation of the shaft with which the motor is associated is attained.

This invention embodies improvements in the art, more particularly with reference to the patent granted to me on June 16, 1925, No. 1,542,433, for improvements in automatic wind motors, and it is to be understood that the automatically operating devices for effecting feathering movements of the blades may also be manually operated.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a fragmentary side elevational view showing the arms of the wind wheel which are arranged in pairs with the devices for controlling feathering movements of the wind wheel blades disposed between the arms of the pair, Figure 2 is a fragmentary side elevational view of another form of the invention showing a plurality of feathering blades and the devices associated therewith for effecting the release and feathering movements of the blades, Figure 3 is a perspective view showing one of the members carried by the free swinging edge of each blade for holding the blade in its closed and operative position, Figure 4 is a perspective view of the bladed head of the wheel of the wind motor with operating parts removed and showing the blades in open and closed positions, and Figure 5 is a fragmentary elevational view of one of the wheel arms showing the control levers for the feathering blades.

In the accompanying drawing, which for purposes of illustration, show preferred embodiments of the invention, and with particular reference to Fig. 1, there is illustrated one arm of an automatic wind motor and forming a part of the wind wheel in which said arm comprises a pair of spaced bars 5 connected by spaced rods 6 rotatably supported at their opposite ends in said bars while the inner ends of the bars are connected to a hub portion of a wind wheel which in turn is associated with a shaft to be driven, which latter elements are not illustrated. Each rod 6 carries a feathering blade 7 extending between the spaced bars 5 and of a width to escape the adjacent connecting rod to permit swinging or feathering movements of the blades.

Devices are provided for normally holding the blades 7 in their closed and operative positions and also for permitting feathering movements thereof, such devices including a shaft 8 for the free swinging side edge of each blade, and shown in detail in Fig. 3 as having pin projections 9 at each end thereof for pivotal support in any suitable manner in the edges of said blades. One side of the shaft 8 adjacent the upper and lower ends thereof carries projecting lugs 10 that engage the adjacent connecting rod 6 of the bars 5 while the opposite side of said shaft at the lower end thereof carries a laterally projecting arm 11 to engage a side face of the carrying blade at its lower edge, the lower outer end of the arm 11 carrying a roller 12 for purposes presently to appear.

As shown in Fig. 5, a bell crank lever is associated with the arm 11 of each shaft and is pivotally supported as at 13 upon the adjacent bar 5, the leg 14 of the bell crank normally projecting above the bar 5 for engaging the roller 12 on the arm 11. The other leg 15 of each bell crank is pivotally connected to a link 16 that in turn is slidably associated with slotted portions of the operating rod 17 under control of a speed governor or the like. The operating rod 17 is provided with a series of a slotted openings into which the adjacent ends of the links 16 extend, the slotted openings 18 to 21 being of gradually increasing lengths while the remaining group of slotted openings 22 are of the same length and slightly longer than the longer slotted opening 21 of the series previously noted.

It being understood that a single arm of the wind wheel for the automatic wind motor is illustrated fragmentarily in Fig. 1, and said wheel being mounted upon a shaft to be rotated, all of the blades 7 are in their closed and operative positions and are retained against feathering movements by the bell crank legs 14 engaging the arms 11 of the shafts 8 with the lugs 10 upon the shafts engaging the adjacent rods 6. When the wind wheel is rotated, the operating rod 17 being associated with a centrifugal governor or the like will cause sliding movement of the operating rod and the operative end of the outermost link 16 being nearer the outer end of the slot 18 than the other links associated with the slots 19 to 21, the outer bell crank lever will first be operated to release the leg 14 from the roller 12 of the outer shaft 8, permitting pivotal movement of said shaft to disengage the lugs 10 from the adjacent connecting rod 6 with a consequent feathering of the outer blade 7. During increased speed of rotation of the wind wheel, the link devices associated with the slotted openings 19 to 21 in the operating rod 17 will effect in a sequential manner the release and feathering movement of the blades associated with said links, and when the maximum speed of rotation is attained, the links associated with the slotted openings 22 of the same length in the operating rod 17 will effect simultaneous feathering movements of the blades associated therewith. It will, therefore, be seen that the feathering movements of the blades are attained in a step by step manner beginning at the outer end of the arm so that the reduction to inoperativeness of the wind wheel is in a gradual manner and eliminates unnecessary shocks to the mechanism associated with the wind wheel.

In the form of the invention shown in Fig. 1, the arms are arranged in pairs one above the other and relatively immovable with an operating rod 17 interposed between the arms of the pair and having a double link arrangement for effecting in a sequential manner, the feathering of the blades.

A supporting structure and controlling devices for the feathering blades includes a fixed tubular bearing 30 within which is rotatably mounted a hollow shaft 31. The portion of the shaft 31 that projects above the bearing 30 has the spaced bars 5 secured thereto in any suitable manner. Extending through the hollow shaft 31 is a rod 32 which has a collar 33 fixed thereto and carrying a plurality of radial lugs 34 that project through vertical slots 35 in the hollow shaft 31, there being a lug 34 and slot 35 for each wind motor arm or blade. A bell crank lever 36 is pivoted at 37 upon one of the bars 5, the outer end of one leg of the bell crank lever 36 having a link connection 38 with the adjacent lug 34 while the end of the other leg of the bell crank lever 36 has a link connection 39 with the inner end of the operating rod 17.

A pulley 40 is keyed to the lower end of the hollow shaft 31, the belt 41 passing around the pulley 40 also inclosing the small pulley 42 that is carried by the sleeve 43 keyed upon the rotatable shaft 44. A centrifugal governor 45 is arranged at the upper end of the shaft 44. The governor 45 includes a pair of links 46 connected to the sleeve 47 that has a grooved collar 48 rigidly mounted thereon. A rigid bracket arm 49 is mounted in proximity to the rod 32 and has pivotally connected thereto a lever 50 that has a link connection 51 with a yoke 52 that engages the groove of the collar 48. An elongated slot 53 is formed in the lever 50 and receives a pin 54 that is integral with the collar 55 which is loosely mounted upon the rod 32 and being retained against longitudinal movement upon the rod by the rings 56. Another bracket 57 is mounted in proximity to the outer end of the lever 50 and is employed for pivotally supporting a manually operable lever 58 that has a link 59 connecting the same to the adjacent end of the lever 50. It will now be seen that if the wheel exceeds a predetermined speed of rotation, the speed governor mechanism will operate for elevating the rod 32 and collar 33 fixed thereto for operating the bell crank levers 36 to shift the bar 17 and to effect release of the desired ones of the blades 5 in a manner as above described.

While there are herein shown and described the preferred embodiments of the present invention, it is nevertheless to be understood that minor changes may be made therein without departing from the spirit and scope of the invention as claimed.

What is claimed is:—

1. In a wind motor, a wind wheel embodying a plurality of arms, each arm comprising spaced side bars, journaled rods connecting the bars, a blade carried by each rod, means associated with each blade for holding the same in closed operative positions and including a shaft pivotally supported at the free swinging side edge of each blade, lug projections on one side of said shaft engaging the adjacent connecting rod, an arm at the other side of said shaft adjacent the lower end, a roller in the lower end of said arm, a bell crank lever pivotally supported in the adjacent side bar with one leg thereof engaging the roller, an operating rod having a series of slotted openings therein, a link connected to the other leg of each bell crank lever and extending into an adjacent slotted opening of the operating rod, a group of said slotted openings being of gradually increasing operative length from the outer end of said rod to effect sequential release of the blades and the remainder of said slotted openings being of similar length to effect simultaneous release of the other blades.

2. In a wind motor, a wind wheel embodying a plurality of arms, each arm comprising spaced side bars, journaled rods connecting the bars, a blade carried by each rod, means associated with each blade for holding the same in closed operative positions and including a shaft pivotally supported at the free swinging side edge of each blade, lug projections on one side of said shaft engaging the adjacent connecting rod, an arm at the other side of said shaft adjacent the lower end, a roller in the lower end of said arm, a bell crank lever pivotally supported in the adjacent side bar with one leg thereof engaging the roller, an operating rod having a series of slotted openings therein, a link connected to the other leg of each bell crank lever and extending into an adjacent slotted opening of the operating rod, a group of said slotted openings being of gradually increasing operative length from the outer end of said rod to effect sequential release of the blades and the remainder of said slotted openings being of similar length to effect simultaneous release of the other blades, said arms being arranged in pairs with a single operating rod interposed between the arms of the pair and having double link connections with adjacent bell crank levers.

3. In a wind motor, a wind wheel embodying a plurality of arms and each arm having a plurality of feathering blades, means for holding the blades in closed operative positions and devices associated with said blades to effect sequential feathering movements thereof beginning from the outer end for a portion of said blades and said means further operating to effect simultaneous feathering movements of the remaining blades at the inner end of said arm, said devices including a rod having a plurality of spaced slots with one group of slots of increasing length from the outer end of the rod and the other group of slots at the inner end of the rod being of the same length, and lever and link devices associated with the rod slots to be operated by the rod for releasing the blades.

In testimony whereof I affix my signature.

STEFAN ZGLICZYNSKI.